(12) United States Patent
Lee et al.

(10) Patent No.: US 7,234,309 B2
(45) Date of Patent: Jun. 26, 2007

(54) METHOD AND APPARATUS FOR EVAPORATIVE COOLING OF A COOLING FLUID

(75) Inventors: Dae Young Lee, Seoul (KR); Jin Koo Lim, Seoul (KR); Hyun Ki Moon, Bucheon-si (KR)

(73) Assignee: Whizen Global Co., Ltd (KR)

( * ) Notice: Subject to any disclaimer, the term of this patent is extended or adjusted under 35 U.S.C. 154(b) by 193 days.

(21) Appl. No.: 11/053,806

(22) Filed: Feb. 9, 2005

(65) Prior Publication Data

US 2005/0279115 A1 Dec. 22, 2005

(30) Foreign Application Priority Data

Jun. 18, 2004 (KR) .................. 10-2004-0045559

(51) Int. Cl.
*F25D 17/06* (2006.01)

(52) U.S. Cl. ............................. 62/95; 62/314

(58) Field of Classification Search .......... 62/90, 62/95, 305, 309, 310, 314; 165/110, 117, 165/299; 261/151–153, 158, 160
See application file for complete search history.

(56) References Cited

U.S. PATENT DOCUMENTS

| | | | | |
|---|---|---|---|---|
| 1,986,529 A | * | 1/1935 | Ray | 62/121 |
| 2,488,116 A | * | 11/1949 | Berlowitz | 62/310 |
| 3,116,612 A | * | 1/1964 | Pennington | 62/171 |
| 3,169,575 A | * | 2/1965 | Engalitcheff, Jr. et al. | 62/99 |
| 4,156,351 A | * | 5/1979 | Schlom et al. | 62/121 |
| 4,173,924 A | * | 11/1979 | Bradshaw | 454/52 |
| 5,435,382 A | * | 7/1995 | Carter | 165/110 |
| 5,724,828 A | | 3/1998 | Korenic | |
| 6,213,200 B1 | | 4/2001 | Carter et al. | |
| 6,705,096 B2 | * | 3/2004 | Maisotsenko et al. | 62/121 |
| 6,732,544 B1 | * | 5/2004 | Taraboletti et al. | 62/642 |
| 6,779,351 B2 | * | 8/2004 | Maisotsenko et al. | 62/121 |

FOREIGN PATENT DOCUMENTS

| | | |
|---|---|---|
| JP | 7-145743 A * | 6/1995 |
| KR | 10-0133007 B1 | 4/1998 |
| KR | 10-0196791 B1 | 6/1999 |
| KR | 10-0376749 | 3/2003 |
| KR | 10-2003-0032240 A1 | 4/2003 |

* cited by examiner

Primary Examiner—Mohammad M. Ali (57) ABSTRACT

A method and an apparatus of evaporative cooling for reducing the volume of an evaporative cooler by considerably lowering the temperature of a cooling fluid are disclosed. A first cooling fluid, which comprises most part of the cooling fluid evaporatively cooled by an outside air while passing through an evaporative cooling section after circulating in an apparatus to be cooled, re-circulates in the apparatus to be cooled. A second cooling fluid, which is separated from the cooling fluid after being cooled in the evaporative cooling section, passes through a sensible air-cooling section placed at an outside air inlet. Thereby, the inflow outside air is sensibly cooled. The second cooling fluid, which passes through the sensible cooling section, re-circulates in the evaporative cooling section.

17 Claims, 13 Drawing Sheets

PRIOR ART

FIG.9B

PRIOR ART

FIG.9C

PRIOR ART

METHOD AND APPARATUS FOR EVAPORATIVE COOLING OF A COOLING FLUID

BACKGROUND OF THE INVENTION

1. Field of the Invention

The present invention relates to a method and an apparatus for evaporative cooling of a cooling fluid. More particularly, the present invention relates to a method and an apparatus for evaporative cooling of a cooling fluid, which is capable of considerably reducing the volume of an evaporative cooler such as a cooling tower by cooling a cooling fluid to a lower temperature, which has been heated due to heat exchange as it circulated in an apparatus to be cooled in a cooling tower or an indoor or outdoor unit of a general air conditioner, etc.

2. Description of the Related Art

In cooling systems, a cooling fluid takes heat away from an apparatus to be cooled by absorbing heat from the apparatus as it circulates therein. The cooling fluid heated by this process is cooled by releasing heat through a cooling process such as evaporative cooling and then it is re-circulated to the apparatus to be cooled.

Herein, the device for cooling the heated cooling fluid and re-circulating the cooling fluid in the apparatus to be cooled is installed on rooftops of buildings. The device is constituted of an evaporative cooler which evaporatively cools the cooling fluid having been heated circulating the apparatus to be cooled.

A cooling tower is one general example of such evaporative coolers.

In particular, the cooling tower can be classified according to the way of contact between the air and the cooling fluid into the direct-contact tower and the indirect-contact tower, or classified according to the relative flow directions of the air and the cooling fluid into the counter flow type tower and the cross flow type tower.

Figure 9A:
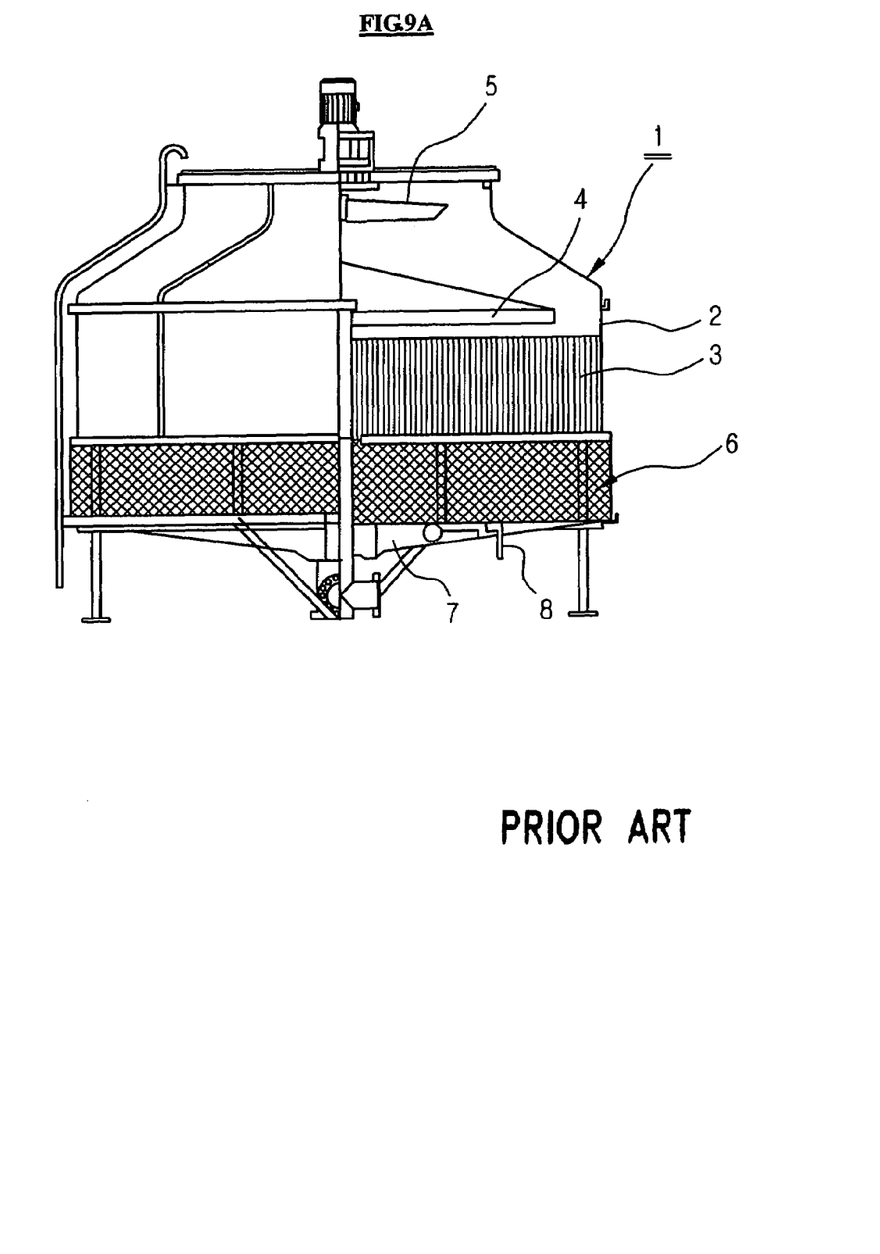
FIG. 9A is a side plan view of an apparatus for evaporative cooling of a cooling fluid that is prior art.

As shown in FIG. 9A, in the conventional direct-contact cooling tower, a ventilating fan 5 is installed in an upper portion of a main body 2 and an evaporative cooling section 3 is installed in a middle portion of the main body 2. Furthermore, a sprinkler 4 for spraying a cooling fluid is installed in an upper part of the evaporative cooling section 3. Also, a collection sump 7 is placed under the main body 2 and a supplementary water pipe 8 for compensating for the evaporation loss of the cooling fluid is installed in the collection sump 7.

In the cooling tower constituted as described above, if the sprinkler 4 sprays a cooling fluid as the atmospheric air passes through the evaporative cooling section 3, the cooling fluid is evaporatively cooled as it passes through the evaporative cooling section 3.

The cooling fluid, which has been evaporatively cooled by the above process, circulates in the apparatus to be cooled. This process is repeated.

According to the conventional cooling tower of the prior art, atmospheric air introduced into an inlet 6 passes through the evaporative cooling section 3 and moves toward the ventilating fan 5. During this process, contact of the induced air with a cooling fluid injected by the sprinkler 4 causes the evaporation of the cooling fluid, so that the cooling fluid can be evaporatively cooled.

Figure 9B:
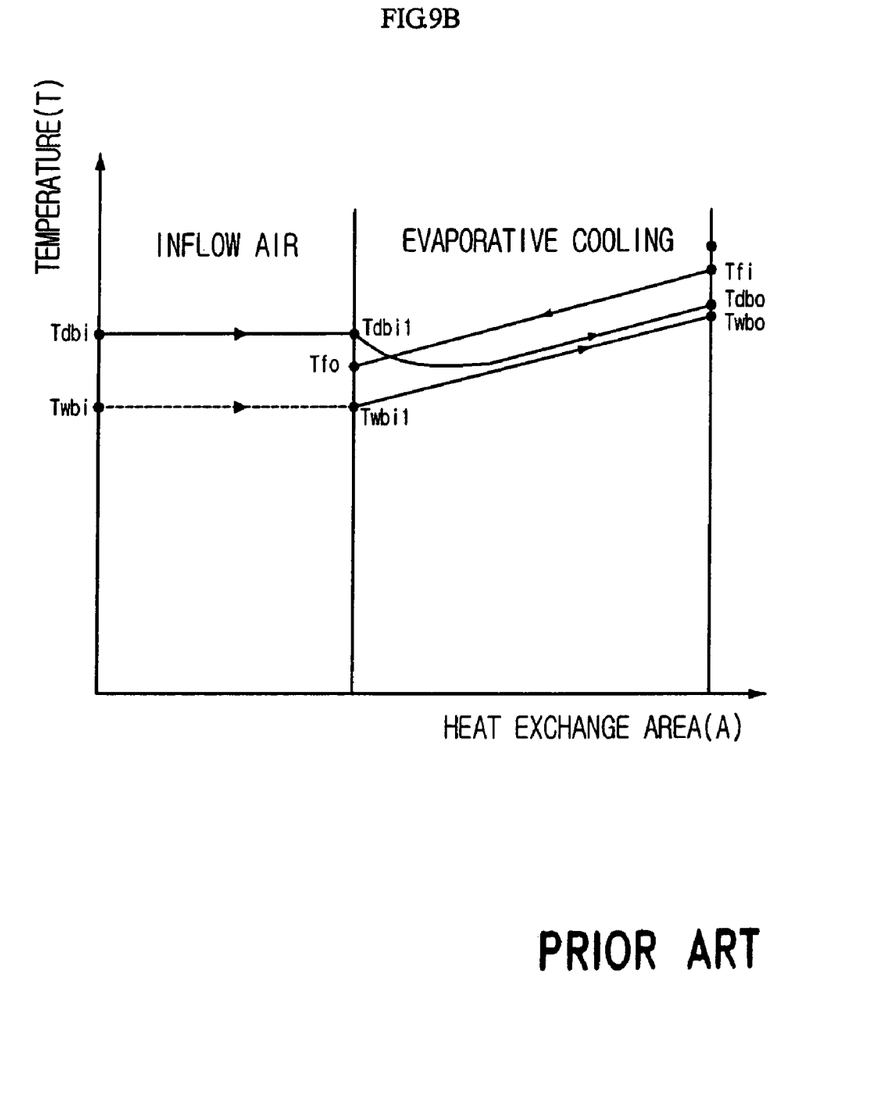
FIG. 9B is a graph showing the operation of a prior art of evaporative cooling apparatus for cooling fluid as shown in FIG. 9A.

The corresponding changes in the temperature of the air and the cooling fluid are depicted in FIG. 9B. As shown in FIG. 9B, the inflow air induced from the atmosphere is introduced into the evaporative cooling section with the wet-bulb temperature $Twbi1$, evaporatively cools the cooling fluid and then is discharged with the outlet wet-bulb temperature $Twbo$ increased higher than the inlet wet-bulb temperature $Twbi1$. Thereby, the cooling fluid is cooled from the inlet cooling fluid temperature $Tfi$ to the outlet cooling fluid temperature $Tfo$. In this cooling procedure, the evaporative cooling temperature of the cooling fluid is limited to the wet-bulb temperature $Twbi$ of the induced atmospheric air.

Since the wet-bulb temperature of the atmosphere can not be controlled arbitrarily, the heat and mass transfer between the air and the cooling fluid are devised to be improved in the prior arts for a better performance of the cooling tower so that the outlet temperature of the cooling fluid comes closer to the atmospheric wet-bulb temperature. For the improved heat and mass transfer, the filler composing the evaporative cooling section 3 and the ventilating fan 5 must be enlarged, which results in an undesirable increase in the external volume of the cooling tower.

Figure 9C:
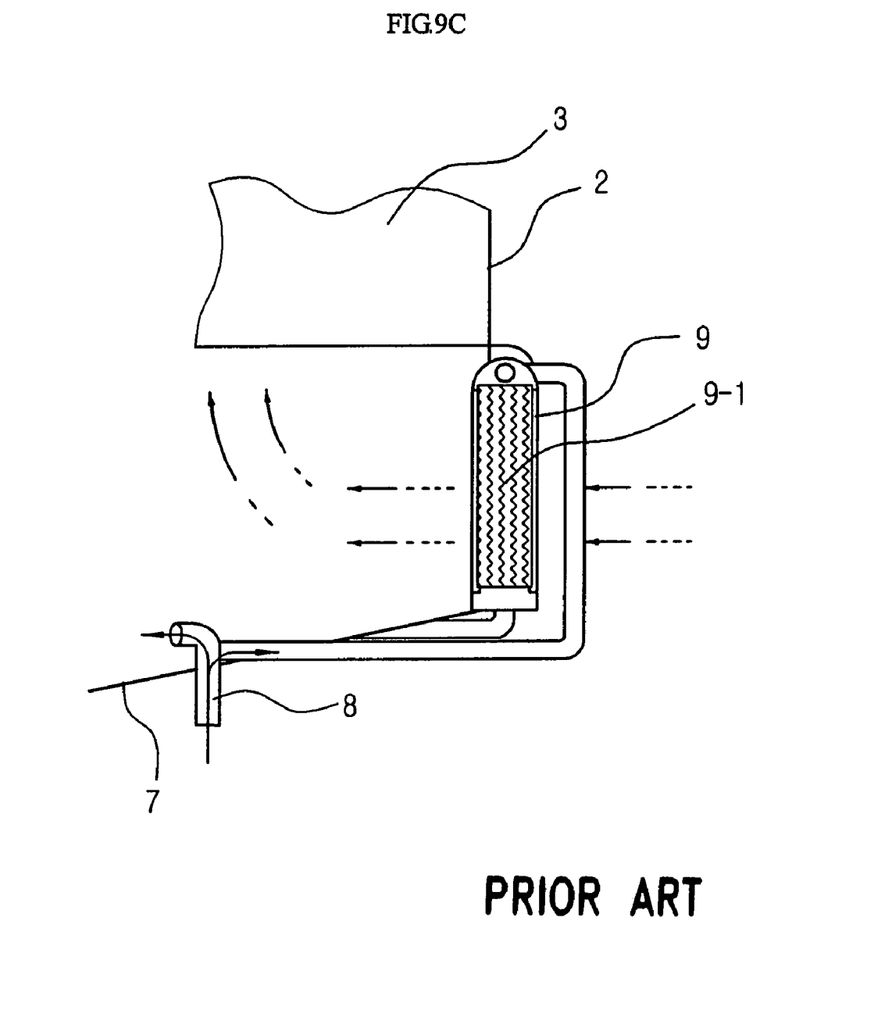
FIG. 9C is a partial side plan view of an apparatus for evaporative cooling of a cooling fluid known in the prior art.

For an improved performance of the cooling tower, Korean Laid-open Patent Publication No. 10-2003-0032240 (published on Apr. 26, 2003) discloses an apparatus for evaporative cooling of a cooling fluid wherein a pre-cooler 9 is installed in an inlet opening 6 of a main body 2 as shown in FIG. 9C. The inflowing outside air is cooled in advance in the pre-cooler 9 by exchanging heat with the supplementary water to make up for the evaporation loss of the cooling fluid.

However, the pre-cooler 9 of Korean Laid-open Patent Publication No. 10-2003-0032240 has problems as follows:

Firstly, since the cooling fluid is cooled usually by about 5° C. in the evaporative cooling section 3, the amount of evaporation is little but 1% of the whole circulating amount of the cooling fluid. Accordingly, the supplementary water to be compensated is only 1% of the total cooling fluid. Therefore, the cooling effect of that small amount of the compensation water is not sufficient enough to cool the relatively large amount of inflowing air even though the temperature of the water is much lower than that of the air.

Secondly, as shown in FIG. 9C, according to Korean Laid-open Patent Publication No. 10-2003-0032240, the supplementary water in the pre-cooler 9 is injected into the filler 9-1 to directly contact the outside air. Thus, the humidity of the air supplied to the evaporative cooling section 3 through the pre-cooler increases due to the direct contact with the water, which results in an increase in the wet-bulb temperature of the inlet air $Twbi1$ causing a decrease in the evaporative cooling effect.

Meanwhile, there are additional prior arts such as Korean Patent No. 133007 (published on Jan. 3, 1995; corresponding U.S. patent application Ser. No. 08/078,629), Korean Patent No. 196791 (published on Jun. 15, 1999; corresponding U.S. patent application Ser. No. 08/426,029) and Korean Patent No. 376749 (published on Mar. 19, 2003; corresponding U.S. patent application Ser. No. 09/265,504). Each of the above patents is constituted to reduce the consumption amount of the evaporation water by employing a dry type and a wet type together or employing only the wet type according to the conditions of the outside air.

However, in the above patents, since the inflow air induced from the outside is introduced into the evaporative cooling section without a change of the temperature, the evaporative cooling temperature of the cooling fluid is limited to the wet-bulb temperature of the atmospheric air as usual conventional cooling towers.

SUMMARY OF THE INVENTION

Thus, the present invention has been contrived to solve the above problems of the prior arts. An object of the present invention is to reduce the wet-bulb temperature of the air being introduced into the evaporative cooling section by cooling sensibly the introduced outside air without an increase in the humidity using a part of the cooling fluid which has been evaporatively cooled in the evaporative cooling section of a cooling apparatus such as a cooling tower, thereby providing a means for maximizing the cooling efficiency of the cooling apparatus.

In order to accomplish the above object, the present invention provides a method for evaporative cooling of a cooling fluid, comprising the steps of:

A) dividing the cooling fluid, which has been evaporatively cooled by outside air as it passed through an evaporative cooling section, into a first cooling fluid and a second cooling fluid, and re-circulating the first cooling fluid in an apparatus to be cooled;

B) circulating the second cooling fluid in a sensible air-cooling section placed at an outside air inlet, and cooling sensibly the inflow outside air by exchanging heat with the second cooling fluid;

C) mixing the second cooling fluid, which has circulated in the sensible air-cooling section, with the first cooling fluid, which has circulated in the apparatus to be cooled, and flowing the mixed cooling fluid into the evaporative cooling section again; and D) evaporatively cooling the mixed cooling fluid by the air which has been sensibly cooled while passing through the sensible air-cooling section.

Repeating the aforementioned four steps of cooling, the cooling fluid can be cooled to a temperature even lower than the atmospheric wet-bulb temperature and ideally to the atmospheric dew-point temperature. This is because the inlet air is cooled sensibly without a change in the humidity to reduce its wet-bulb temperature before flowing into the evaporative cooling section. Since the wet-bulb temperature of the inlet air of the evaporative cooling section is lower than that of the atmospheric air, the cooling fluid can be cooled down more effectively to lower temperature than that at the conventional cooling towers. Additionally, if the cooling fluid of the lower temperature is extracted and supplied to the sensible air-cooling section, the inlet air can be cooled even colder to have much lower wet-bulb temperature. Subsequently, the cooling fluid can be cooled even lower down, and ideally, to the atmospheric dew-point temperature if the heat and mass transfer conductance is infinitely large enough in both the sensible air-cooling section and the evaporative cooling section.

Meanwhile, the present invention provides an apparatus for evaporative cooling of a cooling fluid, the apparatus comprising:

an evaporative cooling section installed in an evaporative cooler so that the cooling fluid can be evaporatively cooled;

a sensible air-cooling section placed at an air inlet of the evaporative cooler for sensible cooling of the induced outside air by passing there through the second cooling fluid extracted from the cooling fluid evaporatively cooled in the evaporative cooling section; and a circulating member to flow the second cooling fluid heated by absorbing the heat from the air in the sensible air-cooling section, back to the evaporative cooling section together with the first cooling fluid, which has circulated in the apparatus to be cooled.

The evaporative cooler according to the present invention can be applied to a cooling tower for buildings, a cooling tower for industrial uses, an outdoor unit for a general air conditioner or an indoor unit for an air conditioner.

The present invention can be applied either to a direct-contact cooling tower wherein a cooling fluid goes into direct contact with the outside air or an indirect contact cooling tower wherein a cooling fluid comes into indirect contact with the outside air.

BRIEF DESCRIPTION OF THE DRAWINGS

The above object and other characteristics and advantages of the present invention will become more apparent by describing in detail-preferred embodiments thereof with reference to the attached drawings, in which.

DETAILED DESCRIPTION OF THE PREFERRED EMBODIMENTS

Hereinafter, the method and the apparatus for evaporative cooling of a fluid according to the first preferred embodiment of the present invention will be explained in detail with reference to the drawings attached hereto.

Figure 1:
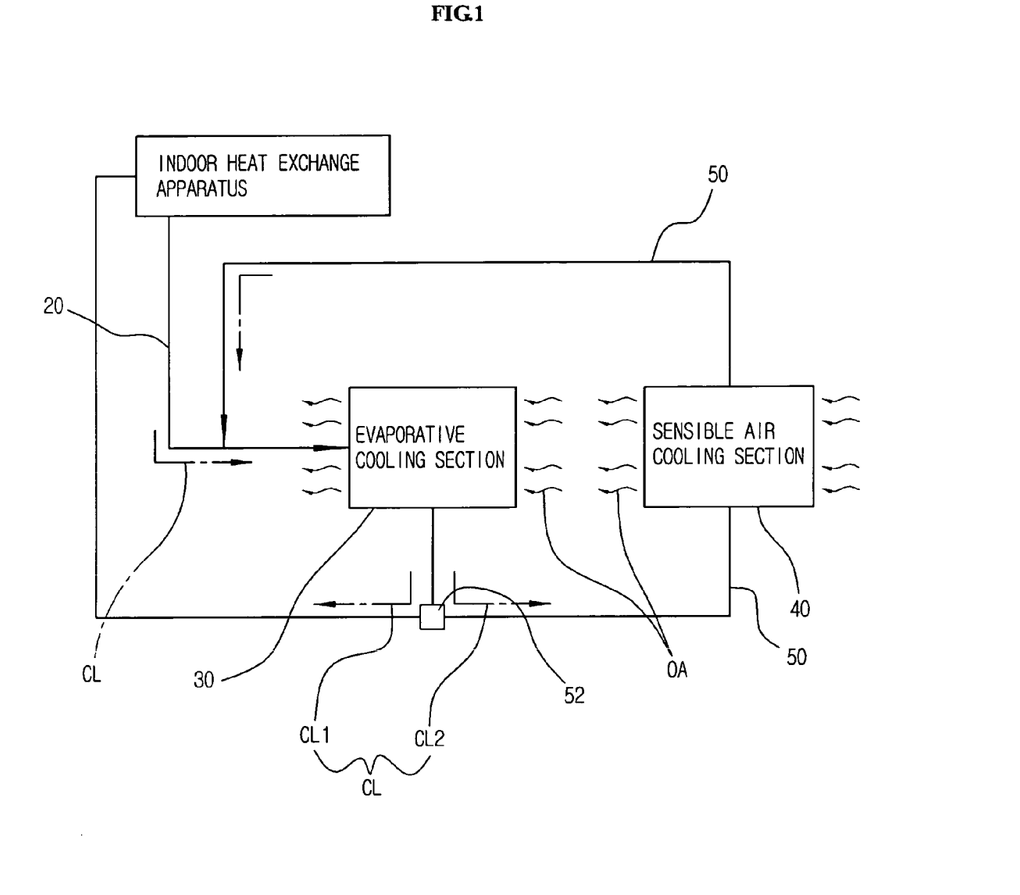
FIG. 1 is a block diagram showing a method for evaporative cooling of a cooling fluid according to the present invention.

FIG. 1 shows a block diagram showing the method for evaporative cooling of a cooling fluid according to the present invention.

Referring to FIG. 1, the cooling fluid (CL), which has been evaporatively cooled by the outside air (OA) while passing through the evaporative cooling section 30, is divided into a first cooling fluid (CL1) and a second cooling fluid (CL2), and then the first cooling fluid (CL1) re-circulates in the apparatus to be cooled (=an indoor heat exchange apparatus).

In addition, the second cooling fluid (CL2) circulates in the sensible air-cooling section 40 placed at the outside air (OA) inlet 16 of the evaporative cooler 30 (see FIG. 2), and cools sensibly the inflow outside air (OA). At this time, the second cooling fluid (CL2) introduced into the sensible air-cooling section 40 passes through it in a multiple pass form as shown in FIGS. 3A and 3B. In this way, the second cooling fluid (CL2) flows in a direction substantially opposite to the moving direction of the outside air (OA).

Accordingly, the second cooling fluid (CL2) indirectly contacts the outside air (OA) in a counter flow form. Also, if the amount of the second cooling fluid (CL2) supplied to the sensible air-cooling section 40 is controlled, the degree of sensible cooling of the outside air (OA) introduced into the evaporative cooling section 30 can also be controlled.

After passing through the sensible air-cooling section 40, the second cooling fluid (CL2) joins and mixes with the first cooling fluid (CL1), which has circulated in the apparatus to be cooled, and the resulting mixed cooling fluid flows into the evaporative cooling section 30.

The resulting mixed cooling fluid is evaporatively cooled by the outside air (OA) having been sensibly cooled in the sensible air-cooling section 40.

Figure 2:
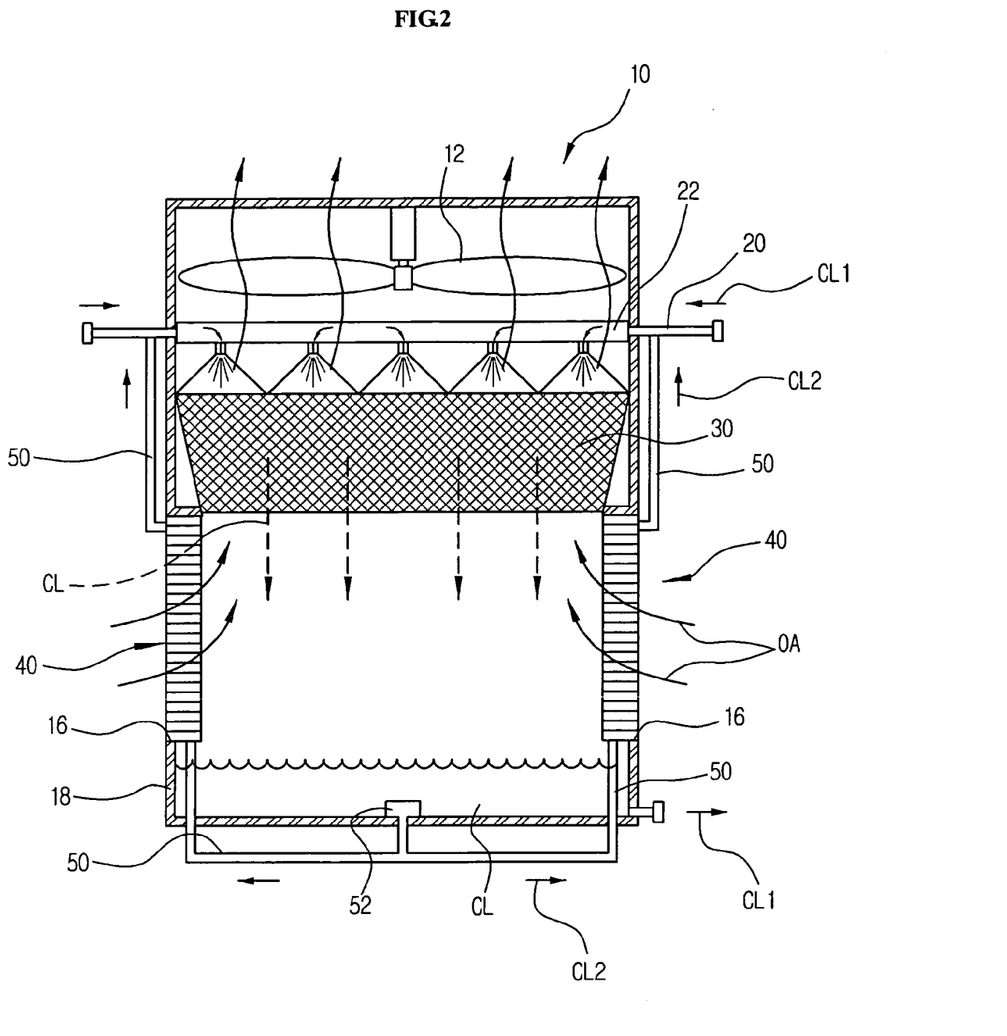
FIG. 2 shows a constitution of an evaporative cooling apparatus according to a preferred first embodiment of the present invention.
Figure 3A:
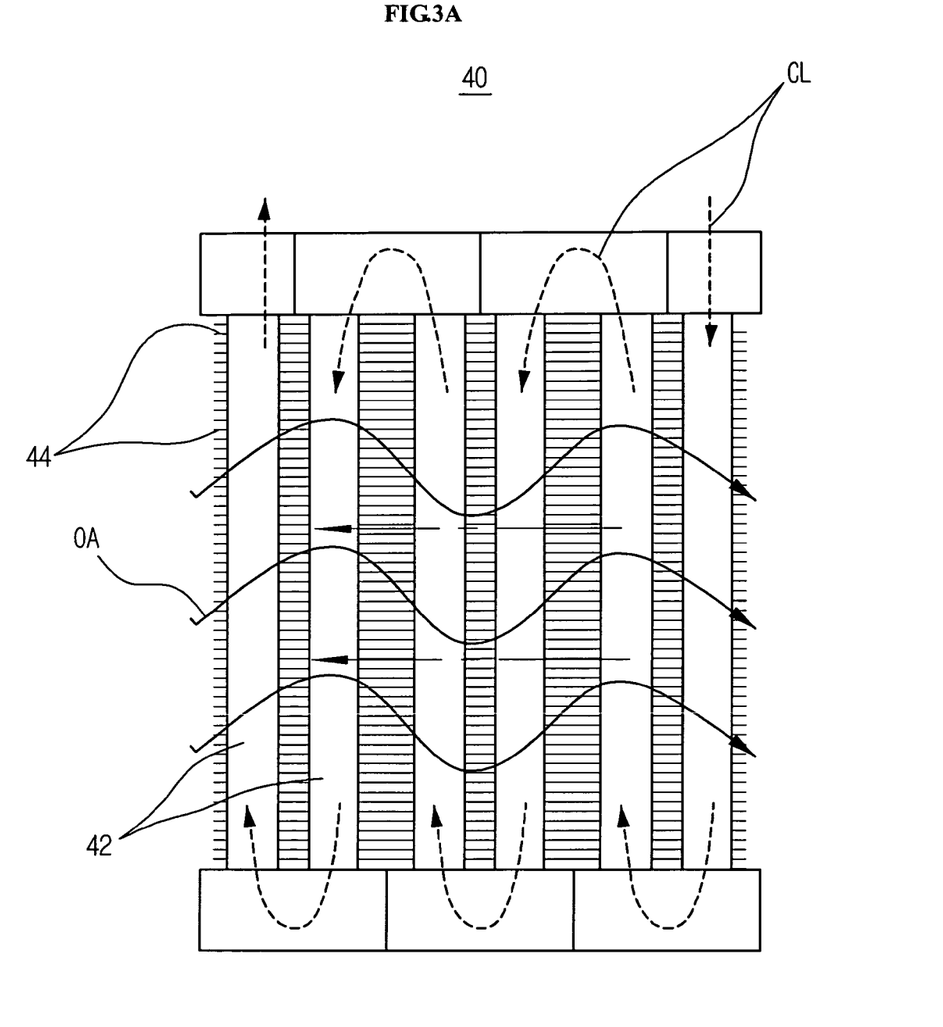
FIGS. 3A and 3B are a schematic view and a perspective view for showing the structure of the sensible air-cooling section as shown in FIG. 2.
Figure 3B:
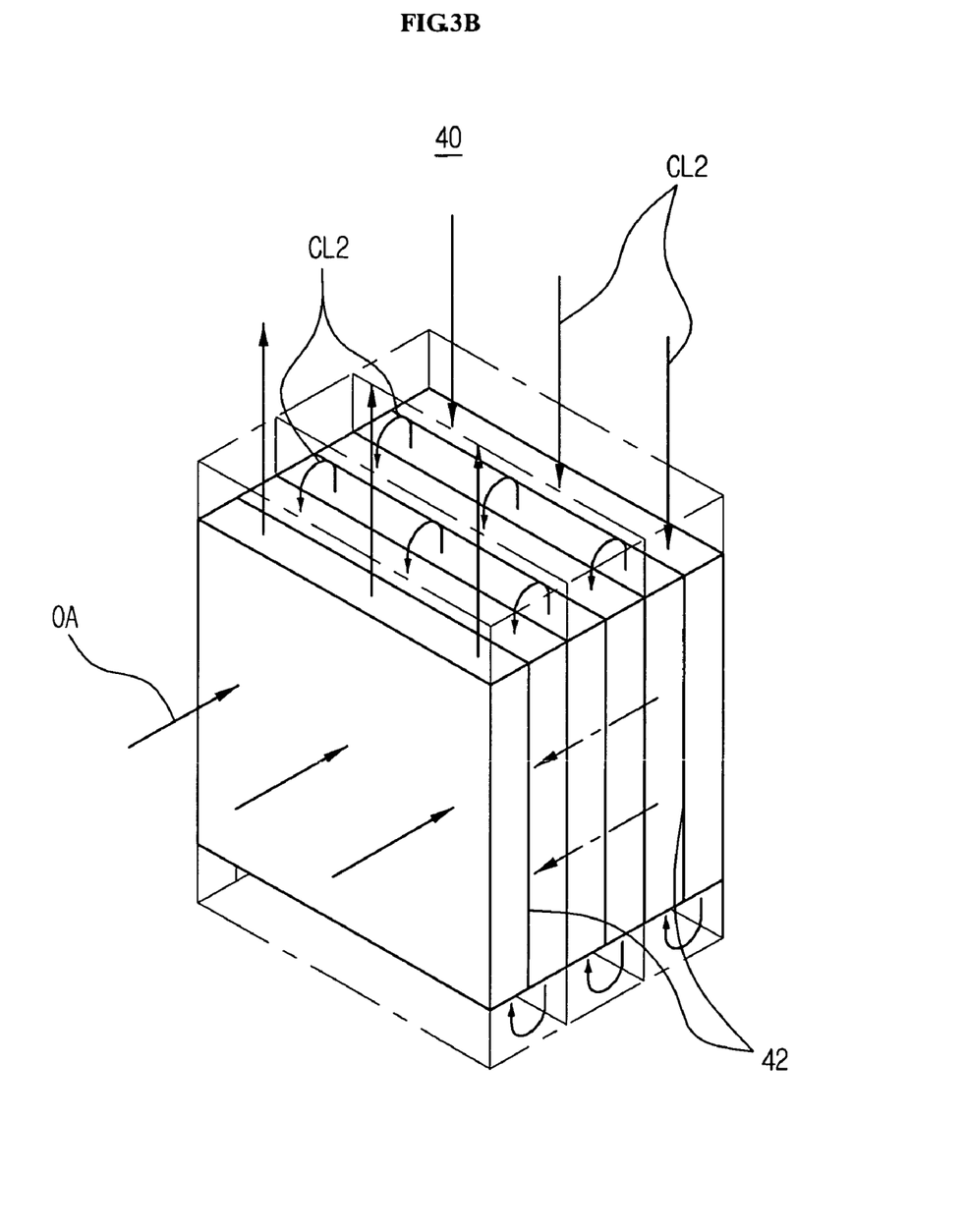

FIG. 2 shows a constitution of an evaporative cooling apparatus according to a preferred first embodiment of the present invention. Referring to FIG. 2, the apparatus for evaporative cooling of a cooling fluid comprises the evaporative cooling section 30 installed in a cooling tower (=an evaporative cooler) for evaporatively cooling a cooling fluid (CL); the sensible air-cooling section 40 installed at the air inlet 16 of the evaporative cooler 10 for sensibly cooling the outside air (OA) by indirect contact of the second cooling fluid (CL2), which was extracted from the cooling fluid (CL1) having been evaporatively cooled in the evaporative cooling section 30; and a circulating member 50 piped in such a manner that the second cooling fluid (CL2), which has flown out of the sensible air-cooling section 40, re-circulates into the evaporative cooling section 30.

Herein, the cooling fluid (CL), which has been evaporatively cooled as it passes through the evaporative cooling section 30 and collected at a collection sump 18, is divided into the first cooling fluid (CL1), which circulates in the apparatus to be cooled and the second cooling fluid (CL2), which circulates in the sensible air-cooling section 40.

Hereinafter, the constitution of the evaporative cooling apparatus as described above will be more detailedly explained.

The cooling tower 10 of this embodiment has the collection sump 18 at a lower part thereof, the inlets 16 at both sides of the lower part thereof, and a ventilating fan 12 at an upper part thereof. Also, the evaporative cooling section 30 is installed in a middle portion of the cooling tower 10. A distribution pipe 22 is provided at the upper part of the evaporative cooling section 30. The first cooling fluid (CL1) having circulated in the apparatus to be cooled (not shown) and the second cooling fluid (CL2) having passed through the sensible air-cooling section 40 are mixed and supplied to the distribution pipe 22 through a cooling fluid feeding pipe 20. The resulting supplied cooling fluid is distributed uniformly to the evaporative cooling section 30 via the distribution pipe 22

The cooling tower 10 shown in FIG. 2 is the direct contact type in which the cooling fluid (CL) directly contacts the introduced outside air at the evaporative cooling section 30. The evaporatively cooled cooling fluid (CL) flowing out of the evaporative cooling section 30 is collected in the collection sump 18 at the bottom of the cooling tower 10.

The circulating member 50 is piped in such a manner that a part of the cooling fluid (CL) is extracted from the collection sump 18 and is flown through the sensible air-cooling section 40 and then re-circulates into the evaporative cooling section 30. The circulating member 50 consists of two pipe portions; a first portion connecting a circulating pump 52 installed in the collection sump 18 with an end of a heat exchange member 42 of the sensible air-cooling section 40 (Refer to FIG. 3A) and a second portion connecting the other end of the heat exchange member 42 to the cooling fluid feeding pipe 20.

By the above constitution, the cooling fluid (CL) collected in the collection sump 18 is divided into a first cooling fluid (CL1) and a second cooling fluid (CL2). Thereafter, the first cooling fluid (CL1) is supplied to and circulated in the apparatus to be cooled, and the second cooling fluid (CL2) is supplied to and passed through the sensible air-cooling section 40 and re-circulated into the cooling fluid feeding pipe 20 by means of the circulating pump 52 and the circulating member 50.

FIGS. 3A and 3B are a schematic view and a perspective view for showing the structure of the sensible air-cooling section 40 as shown in FIG. 2.

The sensible air-cooling section 40 sensibly cools the outside air inflow (OA) by flowing there through the second cooling fluid (CL2), which has been evaporatively cooled at the evaporative cooling section 30.

Referring to FIGS. 3A and 3B, the sensible air-cooling section 40 consists of a plurality of heat exchange members 42. Each heat exchanger member 42 is a tube in which the cooling fluid flows and at the outer surface of which a plurality of cooling fins 44 are installed to increase the heat transfer surface. Each member is connected to each other so that the second cooling fluid (CL2) can pass through it in a multiplepass form.

The sensible air-cooling section 40 with the above structure is placed next to the inlet 16 of the air to the cooling tower 10, so that the second cooling fluid (CL2) can run in a direction substantially opposite to the flowing direction of the outside air inflow (OA) to improve the heat transfer effectiveness.

To explain more in detail, though the flow direction of the second cooling fluid (CL2) at each of the heat exchange member 42 is perpendicular to the flow direction of the outside air (OA), the overall directions run substantially opposite to the flowing direction of the outside air (OA) in a multiple-pass arrangement of the heat exchange members 42 as shown in FIG. 3A.

Since the second cooling fluid (CL2) flows in the tubes of the heat exchange members 42, the second cooling fluid (CL2) does not contact directly with the introduced outside air (OA). Accordingly, the outside air inflow (OA) is cooled only in a sensible temperature by the second cooling fluid (CL2) without an increase in its humidity.

Hereinafter, the operation and the cooling method of the preferred first embodiment of the present invention as constituted above will be explained in detail with reference to FIGS. 1 to 4B.

In the cooling fluid feeding pipe 20, the first cooling fluid (CL1), which has circulated in the apparatus to be cooled, and the second cooling fluid (CL2), which has circulated in the sensible air-cooling section 40, are mixed together. The resulting mixed cooling fluid (CL) is distributed uniformly over the evaporative cooling section 30 through the distribution pipe 22 connected to the cooling fluid feeding pipe 20.

A little part of the cooling fluid (CL) distributed over the evaporative cooling section 30 is evaporated by its contact with the outside air inflow (OA) that is introduced by the inlets 16 as the (CL) passes through the evaporative cooling section 30. Due to the latent heat of evaporation, the rest of the cooling fluid (CL) is cooled to reduce its temperature.

The cooling fluid (CL), which has been evaporatively cooled by the above process, is gathered in the collection sump 18 and divided into a first cooling fluid (CL1) and a second cooling fluid (CL2). The first cooling fluid (CL1) is supplied to the heat exchange apparatus to be cooled. (=Step a)

Meanwhile, the second cooling fluid (CL2) occupying 20%~30% of the entire cooling fluid (CL) is supplied to and flows in the circulating member 50 by means of the circulating pump 52 installed in the collection sump 18. In other words, it flows separately from the first cooling fluid (CL1). The second cooling fluid (CL2) passing through the circulating member 50 by means of the circulating pump 52 as the above is forcibly supplied to the sensible air-cooling sections 40 placed at the air inlets 16. (=Step b)

The second cooling fluid (CL2) supplied to the sensible air-cooling section 40 passes through a plurality of heat exchange members 42 in a multiplepass form, as shown in FIGS. 3A and 3B. During this process, the outside air inflow (OA), which is introduced into the cooling tower 10 (=the evaporative cooler) by means of the ventilating fan 12, contacts the cooling fins 44 and the heat exchange members 42, to thereby cause a heat exchange. (Step b-1)

Namely, the second cooling fluid (CL2), which has been evaporatively cooled to a lower temperature than the outside air (OA), passes through each heat exchange member 42 of the sensible air-cooling section 40, and the cooling fins 44 attached to each heat exchange member 42 contact with the outside air inflow (OA). Thereby, the outside air inflow (OA), which is introduced into the cooling tower 10, is cooled at the sensible air-cooling section 40 by releasing heat to the second cooling fluid (CL2) with a relatively low temperature via the cooling fins 44.

At this time, the overall moving direction of the second cooling fluid (CL2) in the sensible air-cooling section 40 is substantially opposite to the introducing moving direction of the outside air inflow (OA), so a counter flow arrangement is created between the second cooling fluid (CL2) and the outside air inflow (OA) for the improved cooling efficiency.

Also, since the second cooling fluid (CL2) indirectly contacts with the outside air inflow (OA), the humidity of the outside air inflow (OA) does not increase while passing through the sensible air-cooling section 40, which means the outside air inflow (OA) is cooled only in a sensible manner.

Figure 4A:
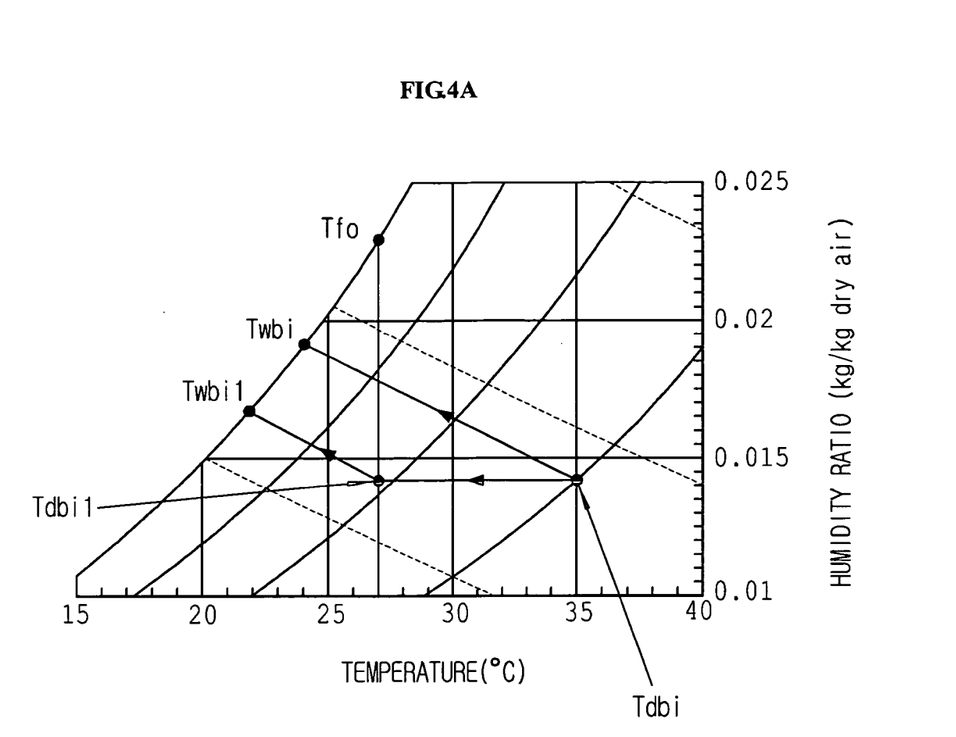
FIGS. 4A and 4B are graphs for showing the operation of the evaporative cooling apparatus for a cooling fluid as shown in FIG. 2.

For instance, as shown in FIG. 4A, when the temperature of the outside air (OA) is 35° C. (Tdbi), the relative humidity is 40%, and the temperature of the second cooling fluid (CL2), which has been evaporatively cooled by the evaporative cooling, is 27° C. (Tfo), then the outside air inflow (OA) can be sensibly cooled from 'Tdbi' to 'Tdbi1' without a change in the humidity. Namely, the wet-bulb temperature of the outside air inflow (OA) decreases from 'Twbi' to 'Twbi1'.

The second cooling fluid (CL2), which has passed through the sensible air-cooling section 40, is supplied to the cooling fluid feeding pipe 20 by means of the circulating member 50 and mixes with the first cooling fluid (CL1), which circulated in the apparatus to be cooled. Then the resulting mixed cooling fluid is supplied back to the evaporative cooling section 30 (=Step c).

Meanwhile, the outside air inflow (OA), which is sensibly cooled by the second cooling fluid (CL2) at the sensible air-cooling section 40, is supplied to the evaporative cooling section 30 and cools evaporatively the cooling fluid (CL) distributed over the evaporative cooling section 30.

In the evaporative cooling, the lower the wet-bulb temperature of the air inflow is, the cooler the cooling fluid can be cooled. Therefore, the cooling fluid can be cooled to the lower temperature in the present invention as compared to the prior arts, since the air inflow is cooled before flowing into the evaporative cooling section 30 to decrease its wet-bulb temperature in the sensible air-cooling section 40. (=Step d)

The above process will be explained based on FIG. 4B as below.

Figure 4B:
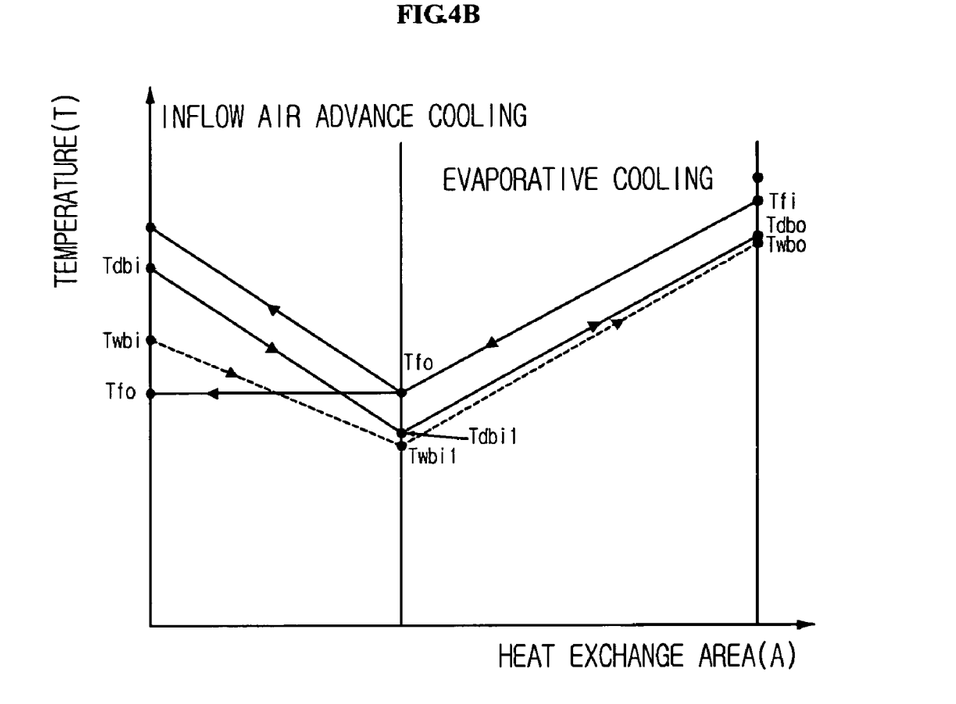

As shown in FIG. 4B, the outside air inflow (OA) is cooled sensibly by the second cooling fluid (CL2) from 'Tdbi' to 'Tdbi1' before flowing into the evaporative cooling section.

The outside air inflow (OA), which has been cooled in advance as the above, is introduced into the evaporative cooling section 30 and evaporatively cools the cooling fluid (CL). Through the evaporative cooling section 30, the temperature of the cooling fluid (CL) decreases from the inlet cooling fluid temperature Tfi to the outlet cooling fluid temperature Tfo. As shown in FIG. 4B, since the wet-bulb temperature of the air inflow is lowered through the sensible air-cooling, the outlet cooling fluid temperature Tfo can be even lower than the wet-bulb temperature Twbi of the outside atmospheric air.

In conventional cooling towers, the lowest temperature ideally attainable for the cooling fluid is the atmospheric wet-bulb temperature, so it is impossible to cool the cooling fluid down to a temperature lower than the atmospheric wet-bulb temperature.

On the contrary, in the present invention, the cooling fluid can be cooled not only lower than the atmospheric wet-bulb temperature but, even more idealing, down to the atmospheric dew-point temperature.

Figure 5:
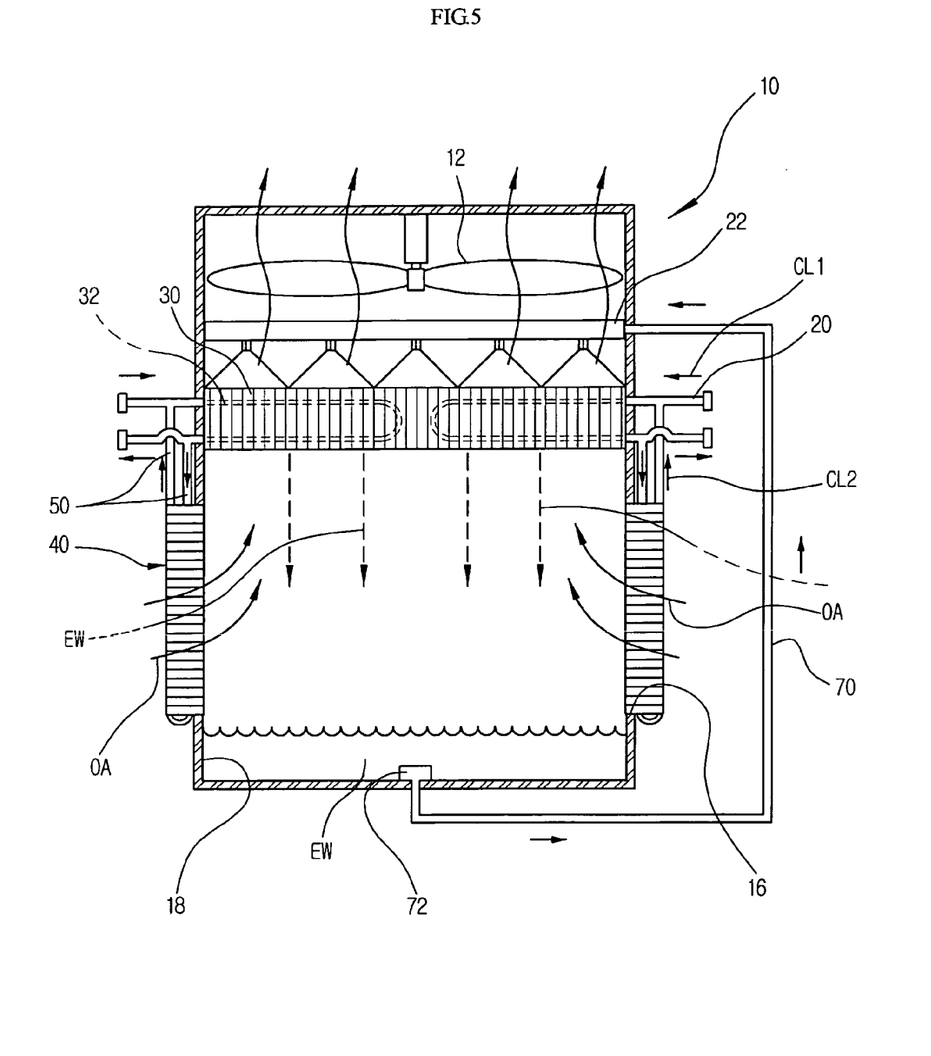
FIG. 5 shows a constitution of an apparatus for evaporative cooling of a cooling fluid according to a preferred second embodiment of the present invention.

Meanwhile, FIG. 5 shows a preferred second embodiment according to the present invention.

As shown in FIG. 5, the preferred second embodiment has the same constitution and operation as the preferred first embodiment except that the cooling fluid (CL) indirectly contacts with the outside air (OA) in the evaporative cooling section 30.

In other words, as shown in FIG. 5, the evaporation water (EW) instead of the cooling fluid (CL) is supplied to the distribution pipe 22 by means of an EW circulating pump 72 and an EW circulating pipe 70, distributed over the evaporative cooling section 30 and passes there through it. The evaporation water (EW) drips down from the evaporation cooling section 30, collects in the collection sump 18 and is supplied back to the evaporative cooling section 30.

The cooling fluid (CL) flows through the heat exchange tubes 32 installed in the evaporative cooling section 30 instead of being distributed over the evaporative cooling section 30. The cooling fluid (CL) is cooled by the latent heat absorption due to the evaporation of the water (EW) from the outer surface of the tubes or the extended fins of the tubes. At the outlet of the heat exchange tubes 32, the cooling fluid (CL) is divided into a first cooling fluid (CL1) and a second cooling fluid (CL2). The rest of the cooling procedure is the same as the preferred first embodiment as shown in FIGS. 1–4B.

The above operation and effect are the same as those of the first embodiment except the point that the cooling fluid (CL) and evaporation water (EW) are separated from each other and do not make contact directly. In this embodiment, since the cooling fluid (CL) circulates in a closed loop isolated from the environment, there are no concerns for problems occurring such as contamination or the evaporation loss of the cooling fluid. Accordingly, the second embodiment can be applied not only to a water cooling but to cooling of other various kinds of fluids such as brine, oil, refrigerant and so on.

Figure 6:
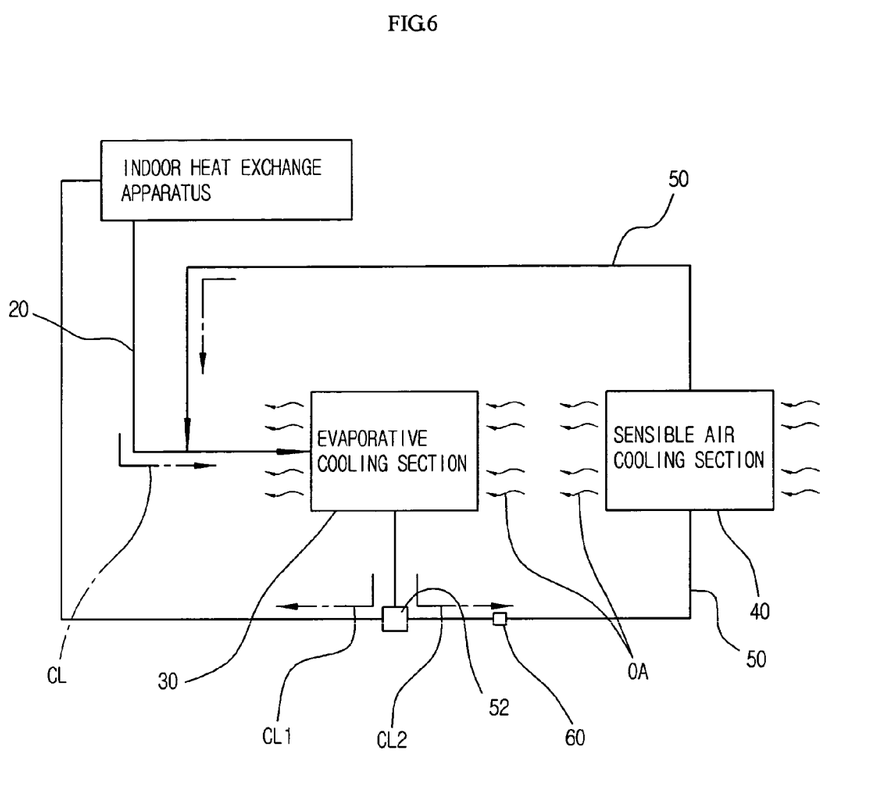
FIG. 6 is a block diagram of an apparatus for evaporative cooling of a cooling fluid according to a preferred third embodiment of the present invention.

Meanwhile, FIG. 6 shows a preferred third embodiment according to the present invention.

As shown in FIG. 6, this preferred third embodiment has the same constitution and operation principle as the first embodiment or the second embodiment except that a controlling valve 60 is disposed in the circulating member 50 in order to control the amount of flow of the second cooling fluid (CL2).

The controlling valve 60 is preferably installed in the circulating member 50 between the circulating pump 52 and the sensible air-cooling section 40, so that it can control the amount of flow of the second cooling fluid (CL2) directed to the sensible air-cooling section 40. The controlling valve 60 is controlled by a separate controlling means and can be constituted of a well-known electronic valve for controlling an amount of flow.

If the flow amount of the second cooling fluid (CL2) supplied to the sensible air-cooling section 40 is controlled appropriately, the degree of sensible cooling of the air inflow (OA) being introduced into the evaporative cooling section 30 can be controlled. Consequently, the temperature of the cooling fluid (CL) at the outlet of the evaporative cooling section 30 can also be controlled.

Figure 7:
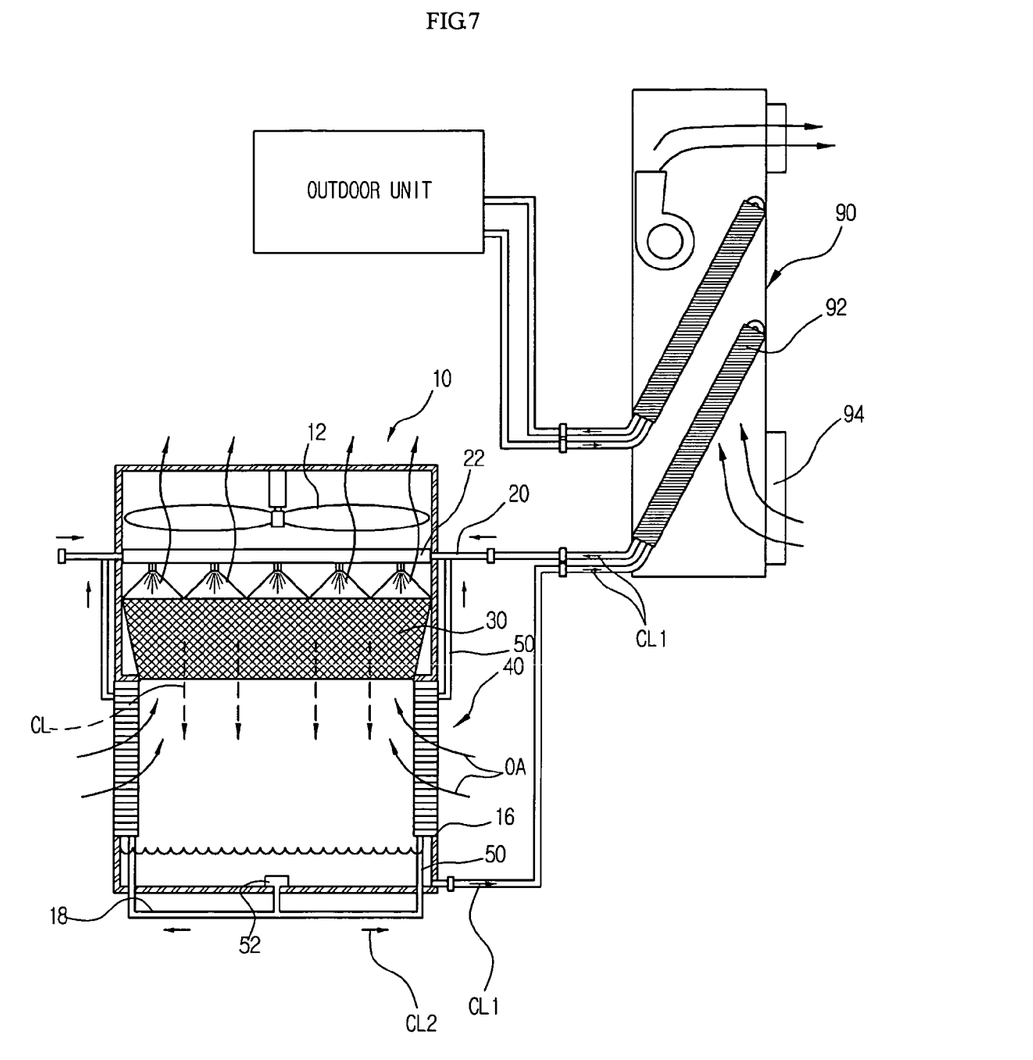
FIG. 7 shows a constitution of an apparatus for evaporative cooling of a cooling fluid according to a preferred fourth embodiment of the present invention.

FIG. 7 shows a preferred fourth embodiment of the present invention.

As shown in FIG. 7, the fourth embodiment is an indoor air-conditioning application of the first embodiment of the present invention.

In the fourth embodiment, the first cooling fluid (CL1), which has been evaporatively cooled in the evaporative cooler 10, circulates in the indoor air-conditioning unit 90. The first cooling fluid (CL1) flows into the auxiliary heat exchanger 92 placed at the air inlet 94 of the air conditioning-unit 90, thereby it cools the inlet air that is introduced into the indoor unit 90. (Step a-1) With this arrangement, the air temperature to the main air-cooling coil in the air-conditioning unit 90 decreases, resulting in a reduction of power consumption for the air-conditioning system.

Figure 8:
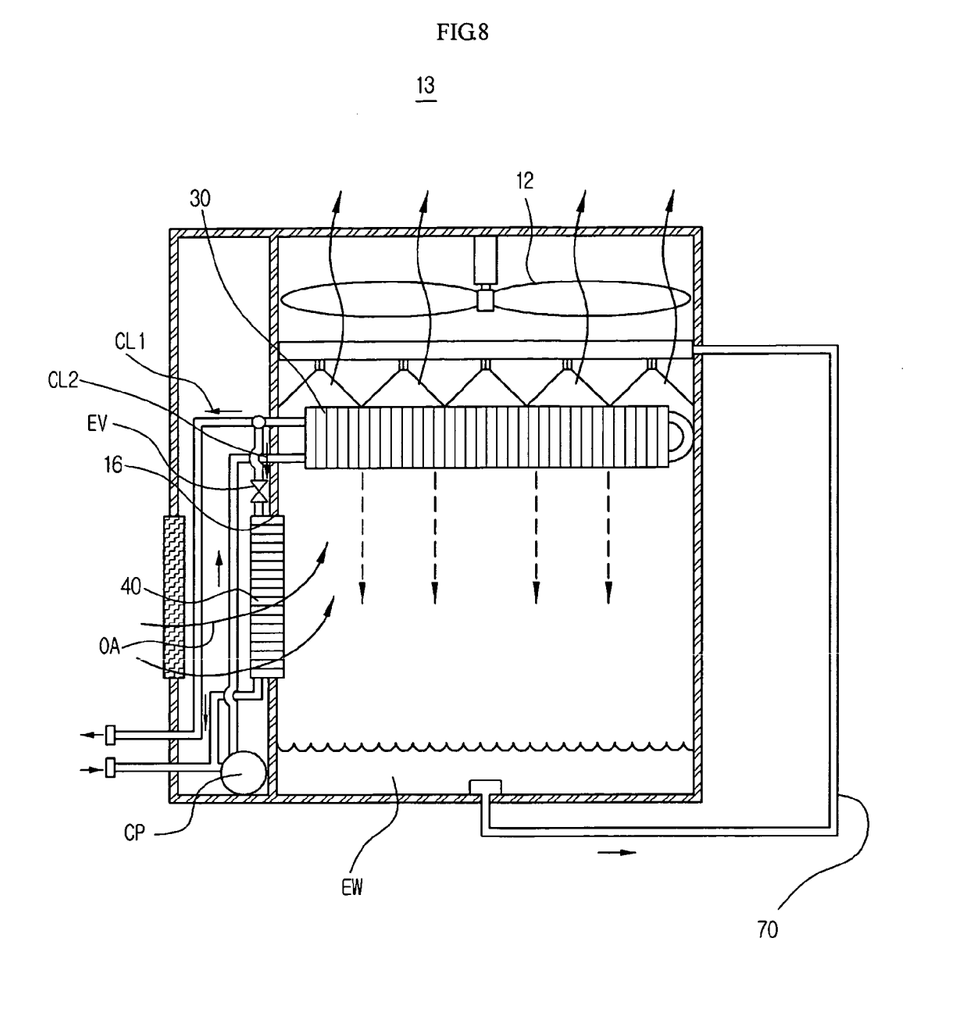
FIG. 8 shows a constitution of an apparatus for evaporative cooling of a cooling fluid according to a preferred fifth embodiment of the present invention.

FIG. 8 shows a preferred fifth embodiment of the present invention.

As shown in FIG. 8, the fifth embodiment is an application of the cooling principle of the present invention to a condensing unit (=an outdoor unit) of a refrigeration system. The condensing unit is to condense a refrigerant vapor into a refrigerant liquid. As the condensing temperature decreases, the performance of the refrigeration system increases.

In the fifth embodiment, the overall constitution of the condensing unit 13 is similar to that of the second embodiment of the present invention.

A Part of the cooling fluid (refrigerant) (CL) condensed at the evaporative cooling section (condenser) 30 is extracted and expanded through an expansion valve (EV) to a low pressure to attain a low temperature. The extracted refrigerant (CL2) in a low temperature flows into the sensible air-cooling section 40 placed at the air inlet 16 and cools sensibly the outside air inflow (OA) to reduce its wet-bulb temperature. Subsequently, the refrigerant (CL2), which has been heated by absorbing heat from the air that passes through the sensible air-cooling section 40, joins with the refrigerant circulating in the main cooling loop just before flowing into a compressor (CP). Then the refrigerant is pressurized to the condensing pressure at the compressor (CP) and flows into the tubes in the evaporative cooling section 30.

In the evaporative cooling section 30, the refrigerant is cooled and condensed by releasing heat to the evaporation water (EW) that evaporates at the outer surface of the refrigerant tubes or the extended fins of the tubes. Since the wet-bulb temperature of the air inflow to the evaporative cooling section is lowered previously in the sensible air-cooling section 40, the condensing temperature of the refrigerant can be made much lower than that in a conventional evaporative condenser. Consequently, according to this embodiment, the electric power consumption of a refrigeration system can be diminished by a significant amount.

INDUSTRIAL APPLICABILITY OF THE PRESENT INVENTION

Thus, the method and the apparatus for evaporative cooling of a cooling fluid thereof according to the preferred embodiments of the present invention sensibly cool the outside air without an increase in the humidity by passing a part of the cooling fluid, which has been evaporatively cooled while passing through the evaporative cooling section, through a sensible heat exchanger placed at the outside air. Also, the process is repeated so that the sensibly cooled outside air evaporatively cools the cooling fluid in the evaporative cooling section and the cooling fluid, which has been evaporatively cooled to a low temperature, sensibly cools the outside air. Therefore, a cooling fluid having a lower temperature can be obtained.

The cooling fluid having a low temperature can be obtained as such; thereby the cooling efficiency of the cooling fluid can be maximized.

Also, since the cooling fluid indirectly contacts and cools the outside air, the outside air can be sensibly cooled without increasing its humidity. Thereby, the wet-bulb temperature of the outside air introduced into the evaporative cooling section is reduced, and thus the cooling fluid can be cooled to even a lower temperature. While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A method for evaporative cooling of a cooling fluid comprising the steps of:
   (a) dividing the cooling fluid, which is evaporatively cooled by outside air while passing through an evaporative cooling section, into a first cooling fluid and a second cooling fluid, and re-circulating the first cooling fluid in an apparatus to be cooled;
   (b) circulating the second cooling fluid in a sensible air-cooling section in an outside air inlet and sensibly cooling the inflow outside air;
   (c) passing the second cooling fluid, which circulates in the sensible air-cooling section, and the first cooling fluid, which circulates in the apparatus to be cooled, through the evaporative cooling section again; and
   (d) evaporatively cooling the cooling fluid, which consists of the first and the second cooling fluids and passes through the evaporative cooling section, by the outside air, which is sensibly cooled in the sensible air-cooling section.

2. The method for evaporative cooling of a cooling fluid as claimed in claim 1, wherein the step (a) comprises the process of circulating in the first cooling fluid, which is evaporatively cooled by the outside air while passing through the evaporative cooling section, in the apparatus to be cooled constituted of an auxiliary sensible cooling section placed at the air ihiet of the indoor unit of an air conditioner to sensibly cool the return air introduced into the indoor unit.

3. The method for evaporative cooling of a cooling fluid as claimed in claim 1, wherein the step (b) comprises the process of controlling the sensible cooling degree of the outside air introduced into the evaporative cooling section by controlling the amount of second cooling fluid supplied to the sensible cooling section.

4. The method for evaporative cooling of a cooling fluid as claimed in claim 1, wherein the step (b) comprises the process of passing the second cooling fluid introduced into the sensible air-cooling section in a multiplepass form and passing the outside air in a direction substantially opposite to the flowing direction of the second cooling fluid in order to indirectly contact the second cooling fluid with the outside air in the form of a counter flow.

5. The method for evaporative cooling of a cooling fluid as claimed in claim 1, wherein the cooling fluid passing through the evaporative cooling section is evaporatively cooled by directly contacting the outside air in the evaporative cooling section.

6. The method for evaporative cooling of a cooling fluid as claimed in claim 1, wherein the cooling fluid passing through the evaporative cooling section is evaporatively cooled by indirectly contacting the outside air.

7. The method for evaporative cooling of a cooling fluid as claimed in claim 2, wherein the step (b) comprises the process of passing the second cooling fluid introduced into the sensible air-cooling section in a multiplepass form and passing the outside air in a direction substantially opposite to the moving direction of the second cooling fluid in order to indirectly contact the second cooling fluid with the outside air in the form of a counter flow.

8. The method for evaporative cooling of a cooling fluid as claimed in claim 3, wherein the step (b) comprises the process of passing the second cooling fluid introduced into the sensible air-cooling section in a multiplepass form and passing the outside air in a direction substantially opposite to the moving direction of the second cooling fluid in order to indirectly contact the second cooling fluid with the outside air in the form of a counter flow.

9. An apparatus for evaporative cooling of a cooling fluid, which comprises:

an evaporative cooling section installed in an evaporative cooler for evaporatively cooling the cooling fluid which divides into a fist cooling fluid and a second cooling fluid;

a sensible cooling section placed at an air inlet of the evaporative cooler for sensibly cooling the outside air inhaled into the evaporative cooler by passing there through the second cooling fluid which is extracted from the cooling fluid evaporatively cooled in the evaporative cooling section, while the first cooling fluid which comprises the rest part of the cooling fluid circulates in the apparatus to be cooled; and a circulating member for circulating the second cooling fluid, which is heated by a heat exchange with the outside air as it passes through the sensible air-cooling section, through the evaporative cooling section again together with the first cooling fluid which circulates in the apparatus to be cooled.

10. The apparatus for evaporative cooling of a cooling fluid as claimed in claim 9, wherein the sensible air-cooling section comprises a plurality of heat exchange members through which the second cooling fluid is passed in a multiplepass form and each end of the adjacent heat exchange members is connected to each other to communicate in a zigzag form, and the outside air passes in horizontal direction of the heat exchange members.

11. The apparatus for evaporative cooling of a cooling fluid as claimed in claim 9, wherein the circulating member comprises a controlling valve for controlling the amount of flow of the second cooling fluid supplied to the sensible air-cooling section.

12. The apparatus for evaporative cooling of a cooling fluid as claimed in claim 10, wherein the circulating member comprises a controlling valve for controlling the amount of flow of the second cooling fluid supplied to the sensible air-cooling section.

13. The apparatus for evaporative cooling of a cooling fluid as claimed in claim 9, wherein the cooling fluid is evaporatively cooled by directly contacting the outside air in the evaporative cooling section.

14. The apparatus for evaporative cooling of a cooling fluid as claimed in claim 9, wherein the cooling fluid is evaporatively cooled by indirectly contacting evaporation water as it passes through the evaporative heat exchange members in the evaporative cooling section, and the evaporation water is circulated from a collection sump to the evaporative cooling section via an evaporation water circulating pipe.

15. The apparatus for evaporative cooling of a cooling fluid as claimed in claim 9, wherein the first cooling fluid, which is evaporatively cooled by the evaporative cooling section, circulates in an auxiliary sensible cooling section placed in the inlet of the indoor unit of an air conditioner and sensibly cools the return air introduced into the indoor unit.

16. The apparatus for evaporative cooling of a cooling fluid as claimed in claim 9, wherein the evaporative cooler comprises an outdoor unit of an air conditioner.

17. The apparatus for evaporative cooling of a cooling fluid as claimed in claim 16, wherein an expansion valve is arranged between the evaporative cooling section and the sensible air-cooling section, and a compressor is installed in the circulating member arranged between the sensible air-cooling section and the evaporative cooling section.

* * * * *